United States Patent Office — 2,866,803 — Patented Dec. 30, 1958

2,866,803

PREPARATION OF ORGANIC ISOCYANATES

David O. De Pree, Baton Rouge, La., assignor to Ethyl Corporation, New York, N. Y., a corporation of Delaware No Drawing. Application December 27, 1955
Serial No. 555,314

6 Claims. (Cl. 260—453)

This invention is concerned with the production of organic isocyanates and is particularly concerned with the production of these compounds by the reaction of organic halides with metal cyanates especially the alkali and alkaline earth metal cyanates.

The present commercial process for the production of organic isocyanates involves the reaction of phosgene with amine salts. Attempts have been made to produce these isocyanates by the reaction of organic halogen compounds with inorganic cyanates such as those of silver and mercury. For example, silver cyanate reacted with isopropyl iodide produces isopropyl isocyanate, and 1,5-diiodopentamethylene reacted with silver cyanate results in pentamethylene diisocyanate. Certain other isocyanates have been prepared employing silver or mercury cyanate as the reactant. These techniques suffer the drawback of the relative expense of the silver and mercury cyanate and therefore have not been employed commercially.

For this reason attempts have been made to substitute the alkali and alkaline earth metal cyanates for silver and mercury cyanate in such a reaction. These investigations have not proven fruitful since the alkali and alkaline earth metal cyanates are less reactive and the products produced comprise the isocyanurates rather than the isocyanates. Specifically, it is known that potassium cyanate will react with highly reactive organic halogen compounds, such as triphenylmethyl chloride, to produce the corresponding isocyanate. However, when attempts are made to react potassium cyanate with the less reactive organic halogen compounds, such as allyl chloride, benzyl chloride, and the like, isocyanurates are obtained.

A more recent discovery has been to employ specific solvents in the reaction of the alkali or alkaline earth metal cyanates with the less reactive organic halogen compounds to produce the isocyanates. In particular, when a tertiary amide such as dimethyl formamide is employed, it has been discovered that isocyanates are prepared in higher yields than heretofore obtained. This significant discovery is still subject to improvement particularly with regard to the yield of the isocyanate. Accordingly, it is highly desirable to further improve the reaction of these metal cyanates with organic halides in order to increase the yield of the isocyanate.

It is therefore an object of the present invention to provide a novel process for the preparation of organic isocyanates. A particular object of this invention is to prepare the organic isocyanates in high yield. A more specific object of this invention is to prepare organic isocyanates by the reaction of an organic halide with an alkali metal or alkaline earth metal cyanate in the presence of a tertiary amine. These and other objects will be evident from the discussion hereinafter.

The surprising discovery has now been made that organic isocyanates can be prepared in high yield by the reaction of a metal cyanate selected from the group consisting of the alkali and alkaline earth metal cyanates with an organic halide in the presence of a tertiary amine for a period less than about 25 minutes. The tertiary amine serves as a catalyst and increases the yield of the isocyanate. The reaction is conducted for a period less than about 25 minutes since it has been found that longer reaction times result in lower yield of the isocyanate. Thus, in a preferred embodiment the reaction is conducted between about 5 to 20 minutes in order to achieve optimum yield. Further, for best results the temperature at which the reaction is conducted should be between about 80 and 170° C.

By the process of this invention the isocyanates are prepared in higher yield than heretofore obtainable by the reaction of alkali or alkaline earth metal cyanates with the organic halides. One particular advantage of this process is that the organic isocyanates are prepared in high yield with short reaction periods resulting in greater output per unit time. A further advantage is that the less reactive organic halides can now be employed, whereas previously good results were obtained only with the highly reactive organic halides such as triphenylmethyl chloride. Still other advantages will be evident from the discussion hereinafter.

The process of this invention is predicated upon conducting the reaction in the presence of tertiary amines. These amines can be represented by the following structural formula

wherein $R_1$, $R_2$ and $R_3$ can be the same or different and are monovalent organic radicals. The monovalent organic radicals can be the monovalent aliphatic or aromatic radicals. The monovalent aliphatic radicals include monovalent alkyl radicals, such as methyl, ethyl, propyl, isopropyl, butyl, and the like, up to and including those containing 18 carbon atoms. They can be alkenyl radicals such as, for example, ethenyl, propenyl, and the like, up to and including those containing 18 carbon atoms. The monovalent aliphatic radicals can also be cycloalkyl radicals, as for example cyclopropyl, cyclobutyl, cycloamyl, and the like, or they can be the cycloalkenyl radicals, such as cyclopentenyl, cyclohexenyl, and the like. When the radicals are monovalent aromatic radicals, they can be monovalent mononuclear or monovalent polynuclear radicals. Typical examples of the mononuclear aromatic radicals include phenyl, o-, m-, or p-ethylphenyl, 2,4-dimethylphenyl, and the like phenyl radicals having one or more substituents such as alkyl, alkenyl, cycloalkyl, and cycloalkenyl radicals bonded to the phenyl radical. Typical examples of the polynuclear aromatic radicals include biphenyl, α-naphthyl, β-anthryl, 2-methyl-α-naphthyl, and the like. It is to be understood that alkaryl, aralkyl, and aralkenyl monovalent radicals can also be employed, as, for example, benzyl, α-phenylethyl, α'-naphthylmethyl, α-phenyl-Δ¹-propenyl, and the like radicals.

Typical but non-limiting examples of the tertiary amines employed include trimethyl amine, triethyl amine, methyldiethyl amine, tripropyl amine, tributyl amine, myristyl dimethyl amine, lauryl diethyl amine, octadecyl-dimethyl amine, tripropenyl amine, cyclohexyldimethyl amine, triphenyl amine, phenyldipropyl amine, tribenzyl amine, and the like.

In addition to the tertiary amines set forth above, heterocyclic tertiary amines can also be employed. Among such are included, for example, 1,2-dimethyl piperidine, 1-butyl piperidine, N-n-pentyl piperidine, and the like alkyl piperidines, and N,N'-dimethyl piperazine, and the like piperazines. In general it is preferred to employ the trialkyl amines, particularly those having between 1 and 4 carbon atoms in the alkyl radicals since such compounds are most readily available and have been found most useful. However, if one of the R groups is a long carbon chain substituent a beneficial detergency is realized. Myristyldimethyl amine is an example of such.

The amine can be present in varying proportions. Some effect in the yield of the isocyanate is obtained when only a trace amount of the amine is employed, and likewise, the use of an excess amount, as for example in solvent proportions, is effective. It has been found practical to employ between about 0.5 to 10 percent by weight of the amine based upon the weight of the metal cyanate employed.

The length of the reaction time is important toward the production of the isocyanates in high yield when conducting the reaction in the presence of the tertiary amines. In general, the reaction can be conducted for a period between about 0.5 to 25 minutes. However, for best results the reaction period should be between about 5 and 20 minutes. Reaction times longer than 20 minutes should be avoided since side reactions occur which thereby decrease the yield of the isocyanate. One such side reaction is the formation of the isocyanurate in appreciable quantities.

The reaction is best conducted in the presence of solvents in order to provide improved contact and more efficient reaction. Many solvents can be employed, and in general the criteria of choice are that they be organic solvents which are liquid under the reaction conditions and are substantially inert to the reactants. The solvents can be, for example, tertiary amides, nitriles, ethers, hydrocarbons, and the like. In some instances an excess of the organic halide is satisfactory as a solvent. Thus, among some of the solvents which can be employed are included dimethyl formamide, dimethyl acetamide, diethyl formamide, and the like tertiary amides; acetonitrile, propionitrile, and the like nitriles; anisole, dioxane, ethylene glycol dimethyl ether, and the like ethers; and benzene, toluene, xylene, kerosene, mineral oil, heavy alkylate, gasoline, octane, and the like hydrocarbons. Still other solvents will be evident to those skilled in the art. In general it is preferred to employ as the solvent the tertiary amides, an excess of the organic halide, or the hydrocarbons. A particularly suitable solvent is dimethyl formamide.

Now turning to the organic halide reactant, in formamide, any organic halide can be employed which has at least one hydrogen atom on the halogen substituted carbon atom. Such definition includes compounds having a plurality of halogens provided the carbon atom on which the halogen is substituted has at least one hydrogen atom. Therefore organic halides of this description which can be employed include halo-ethers and thioethers such as di-(chloromethyl) ether of ethylene glycol, di-(chloromethyl) thioether of ethylene glycol and the like; nitriles such as β-chloro propionitrile, α-chloro-α-chloro-butyronitrile; halo substituted tertiary amines such as 4-chloro-N,N-diethyl butyl amine; nitro substituted hydrocarbon halides such as p-nitro benzyl chloride; and hydrocarbon halides. The organic hydrocarbon halides selected from the group consisting of alkyl (including cycloalkyl), alkenyl (including cycloalkenyl), aralkyl and aralkenyl halides or polyhalides having at least one hydrogen atom on the halogen substituted carbon atom are particularly preferred since the organic isocyanates produced therefrom are of greater stability and more useful in polymer preparation. Stated in another way, the preferred organic halide compounds employed are those compounds containing preferably only hydrogen, carbon, and halogen atoms and the halide function is primary or secondary, preferably the former. Typical but non-limiting examples of these preferred organic halides include benzyl chloride, xylylene dichloride, $\alpha^1$, $\alpha^5$-dichlorodurene, tetramethylene dichloride, n-butyl chloride, allyl chloride, amyl chloride, octyl chloride, hexenyl chloride, β-cyclohexyl-ethyl chloride, 1,4-dichlorocyclohexane, octenyl chloride, and the like, and similar such compounds in which the halide is bromine or iodine. Many other examples will be evident to those skilled in the art.

The alkali and alkaline earth metal cyanates are intended to include sodium cyanate, potassium cyanate, and the like cyanates of lithium, rubidium, cesium, calcium, barium, magnesium, and strontium, or mixtures thereof. The alkali cyanates, especially sodium cyanate, are particularly preferred because of greater availability.

The proportion of the organic halide and the metal cyanate can be varied over a wide range. That is both the reactants can be used in substantially equimolar proportions, or either the metal cyanate or organic halide can be in excess of between about 0.5 to 25 mole percent and higher. In general it is preferred that essentially stoichiometric amounts be employed.

The temperature and pressure at which the reaction is conducted is also varied over a wide range. For example, the temperature can be from between about 60 to 230° C. Optimum temperatures have been found to be between about 80 and 170° C. Temperatures below 80° C. result in lower yields, and likewise, temperatures above 170° C. should be avoided, since side reactions may occur which would thereby decrease the yield of isocyanate. The pressure employed is generally atmospheric, but sub-atmospheric or higher pressures, as about 5000 p. s. i. and higher, can be employed.

The following examples will further illustrate the process of this invention. All parts are by weight.

*Example I*

To a reactor equipped with an external heating and cooling means and means for agitation were added 0.2 mole of sodium cyanate, 95 parts of benzyl chloride, and 4 parts of myristyl dimethyl amine. This mixture was heated to a temperature of 108° C. and maintained at a temperature between 108 and 134° C. for 25 minutes with mild agitation. At the end of this period the reaction mixture was rapidly cooled externally to room temperature. An aliquot portion of the solution thus obtained, 1 ml., was added to 10 ml. of a standard amine solution prepared by dissolving 25 grs. of n-butyl amine in 1 liter of dry dioxane at room temperature. After standing for about 10 minutes this solution was back-titrated with 1 N-HCl. By this procedure it was determined that a 37 percent yield of isocyanate was obtained.

*Example II*

The above procedure was followed essentially as described with the exception that 114 parts of 1,4-dichlorobutane was employed for reaction with 0.2 mole sodium cyanate in the presence of 4 parts of myristyl dimethyl amine. The temperature employed was 150° C., and the reaction time at this temperature was 15 minutes. The yield of isocyanate was 50 percent.

In contrast to this result, when the reaction was conducted essentially as described in the absence of the amine catalyst and for a period of 1 hour, no isocyanate was detected.

*Example III*

This run is conducted essentially as described in Example I employing triethyl amine as the catalyst and allyl chloride as the organic halide in essentially stoichiometric quantity with sodium cyanate. Allyl isocyanate is obtained in high yield.

*Example IV*

The procedure of Example I is repeated with the exception that 0.3 mole of $\alpha^1$, $\alpha^5$-dichlorodurene, 0.75 mole of sodium cyanate, 1 part of trimethyl amine, and 59 parts of anisole are employed. The reaction temperature is maintained at 168° C. for 5 minutes. $\alpha^1$, $\alpha^5$-diisocyanodurene is obtained in high yield.

The above examples are cited merely as illustrations. Similar results are obtained when substituting other alkali or alkaline earth metal cyanates, organic halides, solvents, and amine catalysts described hereinabove.

The reaction mixture can be employed as such. However, it is preferred to separate the organic isocyanate produced therefrom. One effective method for such separation is to add a minor amount of a polymerization inhibitor such as $PCl_3$, $P_2O_5$, CuCl, and the like inhibitors of isocyanate polymerization to the reaction mixture. The reaction mixture can then be fractionally distilled under vacuum to recover the isocyanate product. Alternatively, and preferably, the organic isocyanate is recovered by adding a liquid hydrocarbon medium such as hexanes, petroleum ether and the like, at a temperature between about 30 to 80° C. usually in an essentially equal proportion by volume, with agitation. The mixture is then filtered to remove the by-products. Then a polymerization inhibitor, such as those mentioned above, is added to the filtrate and it is fractionally distilled under vacuum to recover the isocyanate product.

The process of this invention results in products having considerable utility. For example, they can be employed in condensation reactions with alcohols and amines to result in urethans and ureas. They can also be employed as modifiers of polymers and adhesives. The diisocyanates are useful in the preparation of polymeric materials. For example, they can be employed for the preparation of resins which are foamed in place by interpolymerization or copolymerization in the presence of carbon dioxide. Other uses will be evident to those skilled in the art.

Having thus described the process of this invention, it is not intended that it be limited except as set forth in the appended claims.

I claim:

1. A process for the preparation of organic isocyanates, which comprises reacting at a temperature below about 230° C. a metal cyanate selected from the group consisting of alkali and alkaline earth metal cyanates with an organic halide selected from the group consisting of alkyl, alkenyl, aralkyl, and aralkenyl halides having at least one hydrogen atom on the halogen substituted carbon atom in the presence of a tertiary hydrocarbon amine for a period between about 0.5 and 25 minutes.

2. The process of claim 1 wherein the reaction is conducted at a temperature between about 60 to 230° C.

3. A process for the preparation of benzyl isocyanate which comprises reacting benzyl chloride with sodium cyanate in the presence of myristyl dimethyl amine in catalytic quantity at a temperature between about 80 to 170° C. for a period between about 5 and 25 minutes.

4. A process for the preparation of an organic diisocyanate which comprises reacting $\alpha^1,\alpha^5$ dichlorodurene with sodium cyanate in substantially equimolar proportions in the presence of trimethyl amine in catalytic quantity at a temperature between about 80 to 170° C. for a period between about 5 and 25 minutes.

5. A process for the preparation of organic isocyanates which comprises reacting at a temperature below about 230° C. a metal cyanate selected from the group consisting of alkali and alkaline earth metal cyanates with an organic halide selected from the group consisting of alkyl, alkenyl, aralkyl and aralkenyl halides having at least one hydrogen atom on the halogen substituted carbon atom in the presence of a tertiary amine having the formula:

wherein $R_1$, $R_2$ and $R_3$ are monovalent hydrocarbon radicals selected from the group consisting of aliphatic and aromatic radicals for a period between about 0.5 and 25 minutes.

6. The process of claim 1 wherein said organic halide is xylylene dichloride.

No references cited.

UNITED STATES PATENT OFFICE
CERTIFICATE OF CORRECTION

Patent No. 2,866,803　　　　　　　　　　　　　　　　　December 30, 1958

David O. De Pree

It is hereby certified that error appears in the printed specification of the above numbered patent requiring correction and that the said Letters Patent should read as corrected below.

Column 3, lines 46 and 47, for "formamide" read -- general --.

Signed and sealed this 21st day of April 1959.

(SEAL)
Attest:

KARL H. AXLINE
Attesting Officer

ROBERT C. WATSON
Commissioner of Patents